(12) United States Patent
Fujimoto et al.

(10) Patent No.: US 11,325,421 B2
(45) Date of Patent: May 10, 2022

(54) TIRE

(71) Applicant: Sumitomo Rubber Industries, Ltd., Kobe (JP)

(72) Inventors: Yuki Fujimoto, Kobe (JP); Kotaro Tahara, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 561 days.

(21) Appl. No.: 16/374,455

(22) Filed: Apr. 3, 2019

(65) Prior Publication Data

US 2019/0308457 A1    Oct. 10, 2019

(30) Foreign Application Priority Data

Apr. 4, 2018  (JP) .............................. JP2018-072535

(51) Int. Cl.
*B60C 11/01* (2006.01)
*B60C 11/12* (2006.01)

(52) U.S. Cl.
CPC .......... *B60C 11/01* (2013.01); *B60C 11/1236* (2013.01); *B60C 2011/1213* (2013.01); *B60C 2011/1254* (2013.01)

(58) Field of Classification Search
CPC ..................................................... B60C 11/01
See application file for complete search history.

(56) References Cited

U.S. PATENT DOCUMENTS

2016/0288580 A1    10/2016  Higashiura
2019/0118580 A1*    4/2019  Suzuki ................ B60C 11/0304

FOREIGN PATENT DOCUMENTS

| JP | 2006-199101 | * | 8/2006 |
| JP | 2016-120831 | * | 7/2016 |
| JP | 2016-196288 A | | 11/2016 |
| JP | 2017-052362 | * | 3/2017 |

OTHER PUBLICATIONS

English machine translation of JP2016-120831. (Year: 2016).*

* cited by examiner

*Primary Examiner* — Robert C Dye
(74) *Attorney, Agent, or Firm* — Birch, Stewart, Kolasch & Birch, LLP

(57) ABSTRACT

A tire has an intended tire rotational direction and comprises a tread portion having a tread surface defined between tread edges and a pair of buttress surfaces defined as extending radially inwardly from the respective tread edges. One or each of the buttress surfaces is provided with a plurality of protrusions protruding axially outwardly and arranged in the tire circumferential direction. The protrusions include a curved protrusion which extends radially inwardly from the tread surface while curving toward the intended tire rotational direction.

6 Claims, 4 Drawing Sheets ent invention will now be described in detail in conjunction with the accompanying drawings.

TIRE

TECHNICAL FIELD

The present invention relates to a tire, more particularly to a winter tire suitable for running on a snowy road.

BACKGROUND ART

In general, a winter tire or a tire designed for use on a snowy road is provided in the tread portion with lateral grooves in order to enhance snow grip performance when running on a snowy road, lateral grooves form brocks of snow compacted therein, and such snow brocks are subjected to shear to generate traction force and braking force.

As a related technology, there is Patent Document 1 below.

Patent Document 1: Japanese Patent Application Publication No. 2016-196288

SUMMARY OF THE INVENTION

Problems to be Solved by the Invention

In recent years, winter tires are required to be further improved in the snow performance.

In the meantime, when running on a snowy road, a part of the tread portion of such a winter tire sinks into the snow. Accordingly, not only the tread surface, namely, the radially outer surface of the tread portion but also the buttress surface, namely, a surface of a radially outer part of each sidewall portion become in contact with the snow on the road surface.

Thus, focused on this point, the present invention was made, and a primary object of the present invention is to provide a tire of which on-snow performance is further improved.

According to the present invention, a tire has an intended tire rotational direction and comprises a tread portion having a tread surface defined between tread edges and a pair of buttress surfaces defined as extending radially inwardly from the respective tread edges,
wherein
at least one of the buttress surfaces is provided with a plurality of protrusions protruding axially outwardly and arranged in the tire circumferential direction, and
the protrusions include a curved protrusion which extends radially inwardly from the tread surface while curving toward the intended tire rotational direction.

In the tire according to the present invention, therefore, when running on a snowy road, snow contacting with the buttress surface is caught by the curved protrusion and compressed by the curved protrusion utilizing the rotation of the tire. Thereby, a reaction force is generated on the tire. Accordingly, a large traction and excellent snow performance can be obtained.

In the tire according to the present invention, it is preferable that the tread portion comprises a plurality of shoulder blocks which are circumferentially divided by lateral grooves and of which axially outer side surfaces form the buttress surfaces, and
the axially outer side surface of each of the shoulder blocks comprises, in addition to the above-said curved protrusion, a first concave portion which is formed between the curved protrusion and the lateral groove disposed on the heel side in the intended tire rotational direction of the shoulder block concerned.

In the tire according to the present invention, it is preferable that the curved protrusion extends to the lateral groove disposed on the heel side in the intended tire rotational direction.

In the tire according to the present invention, it is preferable that the above-said axially outer side surface of the shoulder block comprises tow of the curved protrusions and a second concave portion between the two curved protrusions.

In the tire according to the present invention, it is preferable that the maximum width in the tire circumferential direction of the first concave portion is larger than the maximum width in the tire circumferential direction of the second concave portion.

In the tire according to the present invention, it is preferable that on the radially inner side of the above-said two curved protrusions provided in the axially outer side surface of the shoulder block, the axially outer side surface of the shoulder block is provided with an auxiliary concave portion extending in the tire circumferential direction.

In the tire according to the present invention, it is preferable that the auxiliary concave portion is connected to the second concave portion.

In the tire according to the present invention, it is preferable that the auxiliary concave portion is separated from the first concave portion by the curved protrusion.

In the tire according to the present invention, it is preferable that the auxiliary concave portion is connected to the lateral groove disposed on the heel side in the intended tire rotational direction of the shoulder block.

In the tire according to the present invention, it is preferable that the auxiliary concave portion is connected to the lateral groove disposed on the toe side in the intended tire rotational direction of the shoulder block.

In the tire according to the present invention, it is preferable that the auxiliary concave portion comprises a part of which width in the tire radial direction is gradually decreased toward the heel side in the intended tire rotational direction.

DESCRIPTION OF THE PREFERRED EMBODIMENTS

Embodiments of the present invention will now be described in detail in conjunction with the accompanying drawings.

Figure 1:
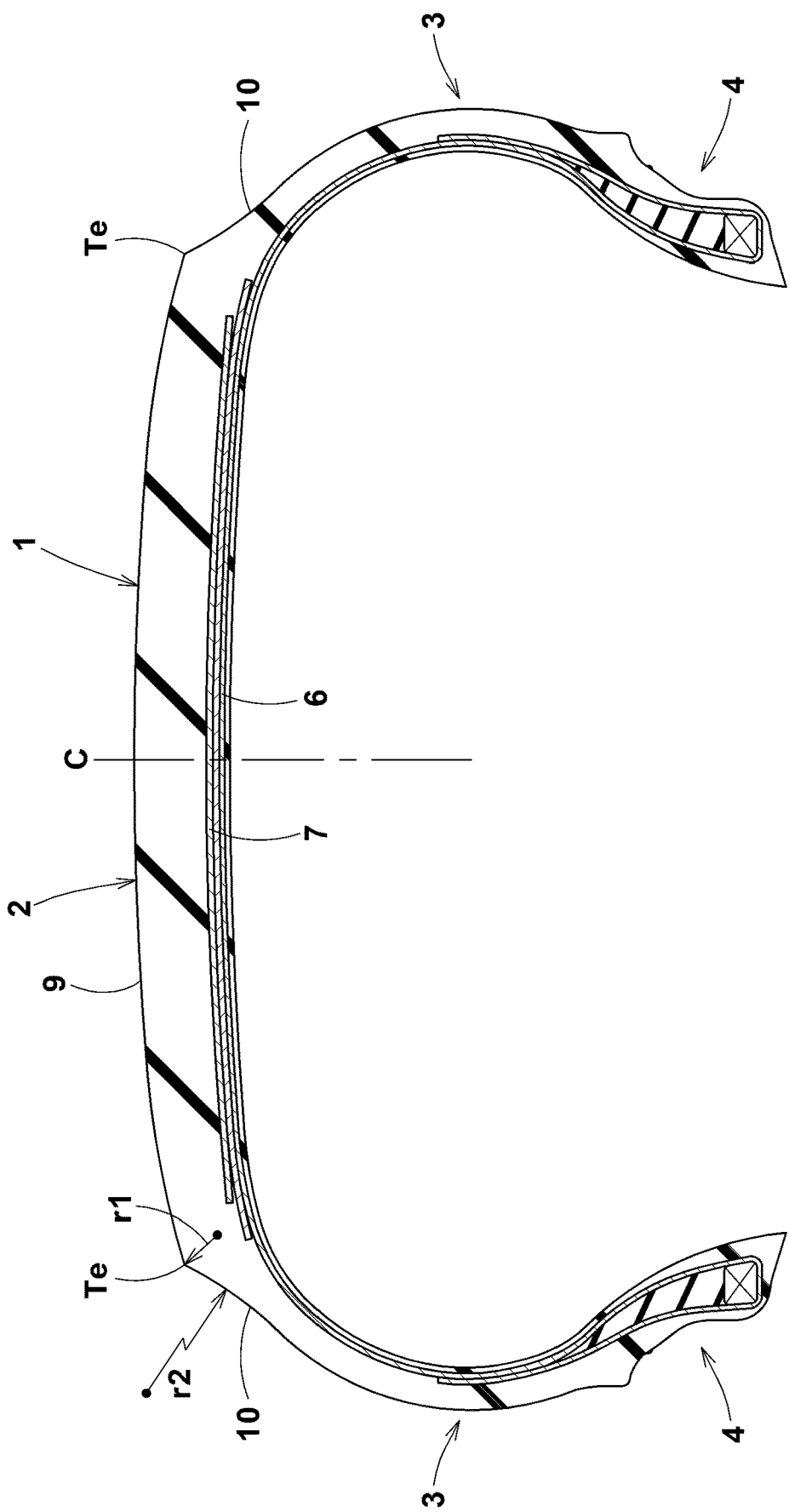
FIG. 1 is a cross sectional view of a tire as an embodiment of the present invention.

FIG. 1 shows a tire 1 as an embodiment of the present invention. The tire 1 is a pneumatic tire so called winter tire designed for use on snowy roads. The tire 1 has an intended tire rotational direction R. In this embodiment, the tire 1 is for a passenger car.

As shown in FIG. 1, the tire 1 comprises a tread portion 2 having tread edges, a pair of bead portions 4, a pair of sidewall portions 3 extending from the tread edges to the bead portions, a carcass 6 extending between the bead portions through the tread portion and the sidewall portions, and a tread reinforcing belt layer 7 disposed in the tread portion 2.

The tire rotational direction R is indicated in the sidewall portion 3 or the like by using characters and/or symbols, for example.

The tread portion 2 has a tread surface 9 defined between the tread edges Te. Each of the sidewall portions 3 has a buttress surface 10 extending radially inwardly from the tread edge Te.

In the case of a pneumatic tire, the tread edges Te are the axial outermost edges of the ground contacting patch of the tire which occurs under a normally inflated loaded condition when the camber angle of the tire is zero.

The normally inflated loaded condition is such that the tire is mounted on a standard wheel rim and inflated to a standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded condition of the tire unless otherwise noted.

The normally inflated unloaded condition is such that the tire is mounted on the standard wheel rim and inflate to the standard pressure but loaded with no tire load.

Figure 2:
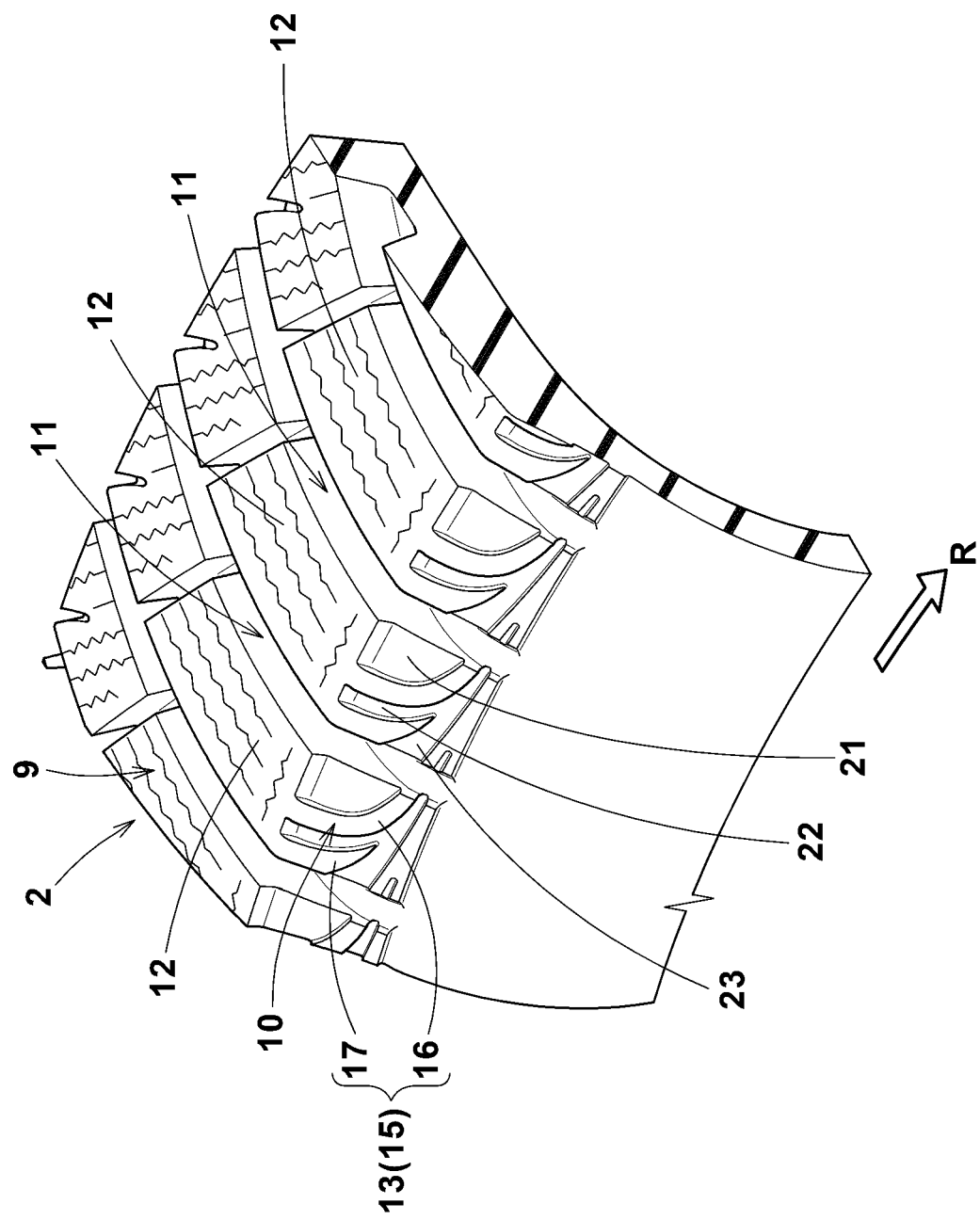
FIG. 2 is a perspective partial view of the tire showing the tread surface and the buttress surface of the tread portion thereof.

FIG. 2, shows a part of the tread surface 9 and a part of the buttress surface 10.

It is preferable that, in the cross section of the tire 1, the tread surface 9 and each of the buttress surfaces 10 are connected through an arc whose radius r1 of curvature is in a range from 1.0 to 10.0 mm, for example.

It is preferable that, in the cross section of the tire 1, the buttress surface 10 is slightly curved concavely with a radius r2 of curvature in a range from 50 to 150 mm, for example.

The tread portion 2 is provided with a plurality of shoulder blocks 12 which are arranged along each of the tread edges and circumferentially divided by lateral grooves 11 opened at the tread edges. Each of the buttress surfaces 10 is formed by the axially outer side surfaces of the shoulder blocks 12.

It is preferable that the lateral grooves 11 of the present embodiment are extended to the vicinity of the tire equator C and inclined with respect to the tire axial direction, for example.

At least one of the buttress surfaces 10, preferably each of the buttress surfaces 10 is provided with a plurality of protrusions 13 arranged in the tire circumferential direction.

Each of the protrusions 13 protrudes axially outwardly from the axially outer side surface of one of the shoulder blocks 12. The protrusion 13 extends radially inwardly from the tread edge Te.

In this example, the protrusion 13 has a width smaller than that of the shoulder block 12 to have a slender shape.

The protrusions 13 include a curved protrusion 15 which extends radially inwardly and continuously from the tread surface 9, while curving toward the heel side in the intended tire rotational direction.

During running on a snowy road, such curved protrusion 15 catches the snow contacting with the buttress surface 10, and compresses the snow utilizing the rotation of the tire, thereby generating a reaction force on the tire. Accordingly, a large traction can be obtained and excellent snow performance is exhibited.

Figure 3:
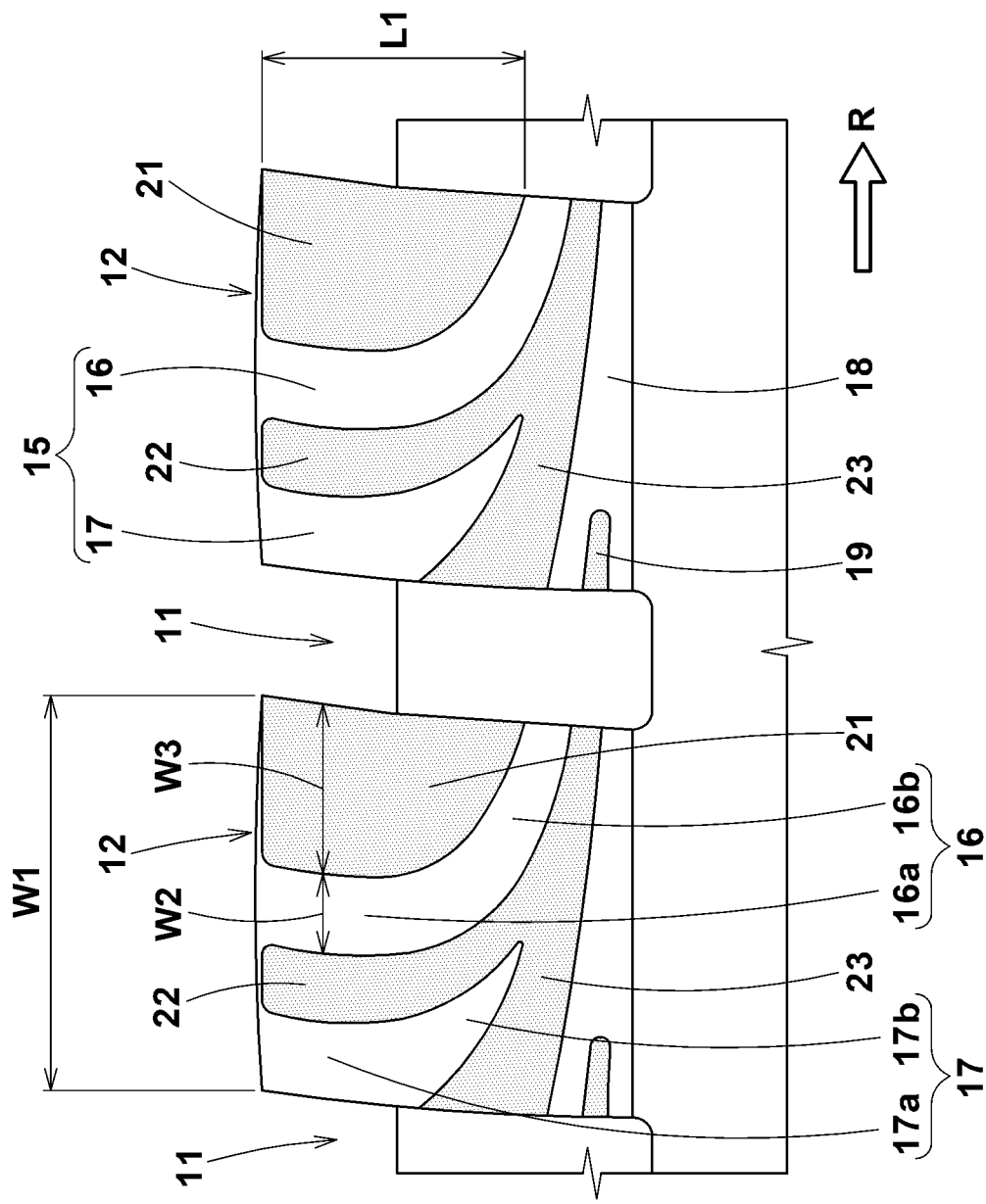
FIG. 3 is an enlarged partial side view of the tire showing the axially outer side surfaces of the shoulder blocks (a part of the buttress surface) of FIG. 2.

FIG. 3 shows the axially outer side surfaces of the adjacent two shoulder blocks 12 forming a part of the buttress surface 10.

As shown, in the present embodiment, the axially outer side surface of each shoulder block 12 is provided with two curved protrusions 15 and one auxiliary protrusion 18 which is disposed on the radially inner side of the two curved protrusions 15.

The two curved protrusions 15 are a first curved protrusion 16 and a second curved protrusion 17.

For example, the first curved protrusion 16 extends radially inwardly from the center portion in the tire circumferential direction of the shoulder block 12, while curving toward the heel side in the intended tire rotational direction R, and is connected to the lateral groove 11 disposed on the heel side of the shoulder block 12.

If the width W2 of the first curved protrusion 16 is large, the volume of the concave portion adjacent to the curved protrusion 15 decreases, and there is a possibility that the above-mentioned effect is reduced. Therefore, the maximum width W2(max) of the first curved protrusion 16 is preferably smaller than 0.50 times the width W1 in the tire circumferential direction of the shoulder block 12.

If the width W2 of the first curved protrusion 16 is too small, the durability of the first curved protrusion 16 may be deteriorated. From such a viewpoint, the minimum width W2(min) of the first curved protrusion 16 is preferably set in a range from 0.15 to 0.25 times the width W1 of the shoulder block 12.

In this example, the first curved protrusion 16 is composed of a constant width portion 16a extending with a substantially constant width, and a gradually decreasing portion 16b extending toward the lateral groove 11 while gradually decreasing its width.

In the constant width portion 16a, the difference between its maximum width and minimum width is limited to less than 5% of the maximum width. In present embodiment, the constant width portion 16a includes a portion which extends, keeping a constant width.

It is preferable that the angle of the widthwise center line of the constant width portion 16a is set in a range from 0 to 20 degrees with respect to the tire axial direction, for example.

The gradually decreasing portion 16b in this example extends from the radially inner end of the constant width portion 16a to the lateral groove 11 on the heel side. It is preferable that the minimum width of the gradually decreasing portion 16b is in a range from 0.40 to 0.60 times the maximum width of the gradually decreasing portion 16b.

In this example, the part of the gradually decreasing portion 16b having the above-said maximum width is connected to the constant width portion 16a, and the part of the gradually decreasing portion 16b having the above-said minimum width is connected to the lateral groove 11 on the heel side.

The width of the gradually decreasing portion 16b may be decreased stepwisely. But, in this example, the width of the gradually decreasing portion 16b is continuously decreased from the maximum width to the minimum width, and the edges of the gradually decreasing portion 16b are smoothly curved. when traveling on a snowy road, such gradually decreasing portion 16b may be moderately deformed. This makes it easy for the snow adhering to the buttress surface 10 to be detached therefrom in order to continue to exert excellent snow performance.

It is preferable that the angle of the gradually decreasing portion 16b with respect to the tire axial direction is gradually increased toward the lateral groove 11 on the heel side. Specifically, the angle of the gradually decreasing portion 16b is set in a range from 20 to 80 degrees with respect to the tire axial direction.

The second curved protrusion 17 has a width similarly to the width of the first curved protrusion 16.

In this example, the second curved protrusion 17 is composed of a first part 17a extending along the constant width portion 16a of the first curved protrusion 16, and a second part 17b extending along the gradually decreasing portion 16b of the first curved protrusion 16.

The first part 17a and the second part 17b are arranged at angles with respect to the tire axial direction which are respectively similar to the angles of the constant width portion 16a and the gradually decreasing portion 16b.

The first part 17a in this example extends while keeping a substantially constant width.

The first part 17a in this example has an edge on the toe side in the intended tire rotational direction R which edge extends continuously from the toe-side edge of the shoulder block.

The width of the second part 17b in this example is gradually decreased toward the heel side in the intended tire rotational direction R.

In comparison with the gradually decreasing portion 16b of the first curved protrusion 16, the second part 17b in this example is more sharpened toward the heel side. In other words, the width of the distal end portion of the second part 17b is smaller than the width of the distal end portion of the gradually decreasing portion 16b.

Such second part 17b can provide a large frictional force when it comes into contact with snow, even tightly compacted, or ice. Further, in the present embodiment, since the second part 17b is positioned on the rear side in the intended tire rotational direction R of the first curved protrusion 16, chipping of the pointed end portion is suppressed, and excellent snow performance is maintained.

The auxiliary protrusion 18 in this example extends from the lateral groove 11 on the heel side to the lateral groove 11 on the toe side in the intended tire rotational direction R. It is preferable that the width of the auxiliary protrusion 18 is gradually increased toward the toe side in the intended tire rotational direction R.

The auxiliary protrusion 18 in this example is provided with a small concave portion 19 extending toward the heel side from the lateral groove 11 on the toe side.

The small concave portion 19 in this example is terminated at a position on the toe side in the intended tire rotational direction R of the distal end of the second curved protrusion 17. Such small concave portion 19 facilitates the detachment of the adhered snow from the buttress surface 10.

In the buttress surface 10 of the present embodiment, the first curved protrusions 16, the second curved protrusions 17 and the auxiliary protrusions 18 are disposed, whereby first concave portions 21, second concave portions 22 and auxiliary concave portions 23 are formed.

As shown in FIG. 3, each of shoulder blocks 12 is provided in its axially outer side surface with the first curved protrusion 16, the second curved protrusion 17, the auxiliary protrusion 18 the first concave portion 21, the second concave portion 22 and the auxiliary concave portion 23. In FIG. 3, the concave portions 21, 22 and 23 are colored by filling these with a fine dot pattern.

The first concave portion 21 is formed between the first curved protrusion 16 and the lateral groove 11 on the heel side in the intended tire rotational direction R of the shoulder block 12.

The second concave portion 22 is formed between the first curved protrusion 16 and the second curved protrusion 17.

The auxiliary concave portion 23 is formed radially inside the first curved protrusion 16 and the second curved protrusion 17, and extends in the tire circumferential direction.

The amount of indentation of each of the concave portions 21, 22 and 23 is, for example, 0.5 to 2.5 mm, preferably 0.5 to 1.5 mm.

In the present embodiment, since the first concave portion 21 is continuous from the lateral groove 11 on the heel side, snow easily enters the first concave portion 21, and the above-described effect is more easily exerted.

The maximum width w3 in the tire circumferential direction of the first concave portion 21 is preferably smaller than 0.50 times the width W1 of the shoulder block 12 in the tire circumferential direction.

Further, the maximum width w3 of the first concave portion 21 is preferably larger than the width of the first curved projected portion 16 and the width of the second curved protrusion 17. The maximum width W3 of the first concave portion 21 is preferably larger than the maximum width in the tire circumferential direction of the second concave portion 22. The maximum width W3 of the first concave portion 21 is preferably 0.35 to 0.45 times the width W1 of the shoulder block 12.

Thereby, the first concave portion 21 having a sufficient width can be formed while securing the width of the curved protrusion 15, and large traction can be obtained.

It is preferable that the dimension L1 in the tire radial direction of the first concave portion 21 is gradually decreased toward the toe side in the intended tire rotational direction R. Such first concave portion 21 can compact the snow utilizing the rotation of the tire.

The dimension L1 in the tire radial direction of the first concave portion 21 is preferably set in a range from 0.50 to 0.70 times the width W1 in the tire circumferential direction of the shoulder block 12.

The second concave portion 22 has a shape similar to those of the first curved protrusion 16 and the second curved protrusion 17 since the second concave portion is disposed therebetween. That is, the second concave portion 22 extends radially inwardly while curving toward the heel side in the intended tire rotational direction R.

It is preferable that the width of the second concave portion 22 gradually decrease toward the inside in the tire radial direction. As a result, it becomes easier to compact the snow in the second concave portion 22 during running on snow, which makes it possible to further improve the performance on the snow.

As shown in FIG. 2, in each of the shoulder blocks 12, the radially outer surface of the shoulder block 12 is continued to the axially outer surface of the curved protrusion 15, therefore, the tread edge lies on the connecting portion between the radially and axially outer surfaces.

The radially outer edges of the first concave portion 21 and the second concave portion 22 are located on the tire equator side of the tread edge, but it can be said that these radially outer edges form part of the tread edge in substance.

As a result, the snow trodden down by the tread surface 9 easily enters the first concave portion 21 and the second concave portion 22, and the above-described function can be further enhanced.

In this example, as shown in FIG. 3, the auxiliary concave portion 23 is connected to the lateral groove 11 on the heel side of the shoulder block 12. Further, the auxiliary concave portion 23 is preferably connected to the lateral groove 11 on the toe side of the shoulder block 12.

Preferably, the auxiliary concave portion 23 in this example is connected with the second concave portion 22. As a result, the auxiliary concave portion 23 compresses the snow together with the second concave portion 22, and large traction can be obtained.

On the other hand, it is preferable that the auxiliary concave portion 23 is separated from the first concave portion 21 by the curved protrusion 15. As a result, the snow adhering to the buttress surface 10 becomes easily detached therefrom, therefore, the excellent snow performance may be constantly obtained.

The auxiliary concave portion 23 preferably comprises a part whose width in the tire radial direction is gradually decreased toward the heel side in the intended tire rotational direction R. The maximum width of the auxiliary concave portion 23 is preferably set in a range from 3 to 12 mm.

Such auxiliary concave portion 23 can prevent the snow from remaining attached to the buttress surface 10.

Figure 4:
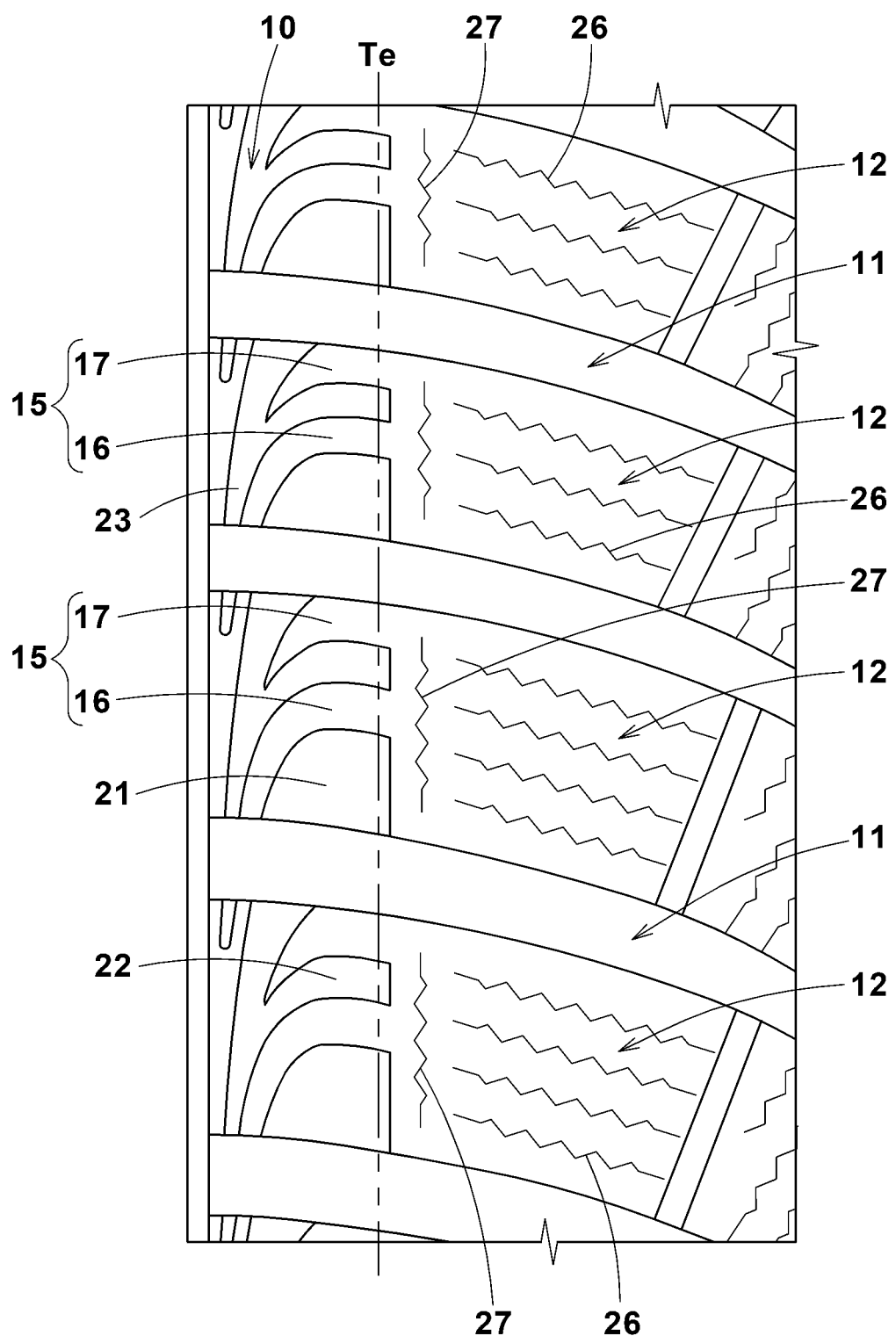
FIG. 4 is a developed view showing a part of the tread surface and the axially outer side surfaces of the shoulder blocks of FIG. 2.

FIG. 4 is a developed view showing the ground contacting top surfaces of the shoulder blocks 12 forming a part of the tread surface 9, and the axially outer side surfaces of the shoulder blocks 12 forming a part of the buttress surface 10. As shown, each shoulder block 12 in this example is provided with a plurality of shoulder sipes 26.

The shoulder sipes 26 in this example extend axially outwardly from the axially inner edge of the shoulder block 12 and are terminated within the shoulder block 12. It is preferable that each shoulder sipe 26 extends in a zigzag manner.

Here, the term "sipe" means a narrow groove having a width less than 1.5 mm inclusive of a cut having no substantial width.

Preferably, each shoulder block 12 is provided with a longitudinal sipe 27 extending in the tire circumferential direction and disposed between the shoulder sipes 26 and the tread edges Te. Such longitudinal sipe 27 serves to moderately deform a near portion of the shoulder block 12 to the buttress surface 10, which makes the snow adhering to the buttress surface 10 easy to detached therefrom.

The longitudinal sipe 27 in this example is a closed sipe whose ends are terminated or closed in the block.

It is preferable that the longitudinal sipe 27 extends in a zigzag manner. Such longitudinal sipe 27 serves to maintain the rigidity of the shoulder block 12.

While detailed description has been made of a preferable embodiment of the present invention, the present invention can be embodied in various forms without being limited to the illustrated embodiment.

Comparison Test

Pneumatic tires of size 205/55R16 (rim size 16×7.0) having the internal structure shown in FIG. 1 were experimentally manufactured as test tires (practical examples EX1-EX7 and comparative example REF) and tested for the snow performance. Comparative example REF has no protrusions in the buttress surfaces, and Practical examples EX1-EX7 had protrusions based on those shown in FIGS. 2 and 3. Otherwise the test tires had the same structure.

Specifications of the test tires are shown in Table 1
<Snow Performance Test>

Using a 1600 cc passenger car with test tires (tire pressure 220 kPa) mounted on all wheels was run on snowy roads, and the test driver evaluated running performance on the snowy roads.

The results are indicated in Table 1 by an index based on the comparative example REF being 100, wherein the larger the numerical value, the better the snow performance.

TABLE 1

| tire | REF | EX1 | EX2 | EX3 | EX4 | EX5 | EX6 | EX7 |
|---|---|---|---|---|---|---|---|---|
| Presence or Absence of curved protrusion | absent | present | present | present | present | present | present | present |
| width ratio W2/W1 | — | 0.20 | 0.15 | 0.25 | 0.20 | 0.20 | 0.20 | 0.20 |
| amount of indentation of concave portion (mm) | — | 1.0 | 1.0 | 1.0 | 0.5 | 1.5 | 1.0 | 1.0 |
| maximum width of auxiliary concave portion (mm) | — | 7.0 | 7.0 | 7.0 | 7.0 | 7.0 | 3.0 | 12.0 |
| snow performance | 100 | 110 | 110 | 108 | 107 | 110 | 108 | 109 |

From the test results, it was confirmed that the tires according to the present invention were improved in the snow performance.

DESCRIPTION OF THE REFERENCE SIGNS 2 tread portion
9 tread surface
10 buttress surface
13 protrusion
15 curved protrusion
R tire Rotational direction
Te tread edge

The invention claimed is:

1. A tire having an intended tire rotational direction and comprising a tread portion having a tread surface defined between tread edges and a pair of buttress surfaces defined as extending radially inwardly from the respective tread edges, wherein
the tread portion is provided with shoulder blocks which are circumferentially divided by lateral grooves and of which axially outer side surfaces form the buttress surfaces, the axially outer side surface of each of the shoulder blocks is provided with a first curved protrusion, a second curved protrusion, a first concave portion, a second concave portion, and an auxiliary concave portion, wherein
the first curved protrusion extends radially inwardly from the tread edge to one of said lateral grooves which is disposed on a heel side in the intended tire rotational direction, of the first curved protrusion, while curving toward the heel side in the form of a rib to have a curved heel-side edge and a curved toe-side edge, the first concave portion is disposed on the heel side of the first curved protrusion and defined by the curved heel-side edge, the one of said lateral grooves and the tread edge, the second curved protrusion is disposed on a toe side in the intended tire rotational of the first curved protrusion and extends radially inwardly from the tread edge along the first curved protrusion, the second concave portion is formed between the first curved protrusion and the second curved protrusion, and extends radially inwardly from the tread edge while curving toward the heel side in the form of a groove, the auxiliary concave portion is disposed radially inside the first curved protrusion and the second curved protrusion adjacently thereto, and extends from one of the lateral grooves on the toe side of the auxiliary concave portion to one of the lateral grooves on the heel side of the auxiliary concave portion in the form of a groove, while gradually decreasing a groove width thereof, and the auxiliary concave portion is connected with the second concave portion.

2. The tire according to claim 1, wherein the maximum width in the tire circumferential direction of said first concave portion is larger than the maximum width in the tire circumferential direction of said second concave portion.

3. The tire according to claim 1, wherein said auxiliary concave portion is connected with the second concave portion at a position between the lateral grooves on the toe side and heel side, but not connected with the first concave portion.

4. The tire according to claim 3, wherein the maximum width in the tire circumferential direction of said first concave portion is larger than the maximum width in the tire circumferential direction of said second concave portion.

5. The tire according to claim 3, wherein the axially outer side surface of each of the shoulder blocks is provided with an auxiliary protrusion which is positioned radially inside the auxiliary concave portion, and extends from the lateral groove on the heel side to the lateral groove on the toe side while gradually increasing its width in the tire radial direction.

6. The tire according to claim 5, wherein the maximum width in the tire circumferential direction of said first concave portion is larger than the maximum width in the tire circumferential direction of said second concave portion.

\* \* \* \* \*